Oct. 14, 1969     P. L. POWELL     3,473,060

INSTRUMENT BUSHING

Original Filed Aug. 8, 1966

INVENTOR

Patrick L. Powell

By *Norton Lesser*

Attorney

United States Patent Office 3,473,060
Patented Oct. 14, 1969

3,473,060
INSTRUMENT BUSHING
Patrick L. Powell, Franklin Park, Ill., assignor to Stewart-Warner Corporation, Chicago, Ill., a corporation of Virginia
Continuation of application Ser. No. 570,960, Aug. 8, 1966. This application June 24, 1968, Ser. No. 744,246
Int. Cl. H02k 7/10
U.S. Cl. 310—97                    1 Claim

ABSTRACT OF THE DISCLOSURE

The following specification describes a sintered bronze bearing having a bore with a Teflon impregnated surface for journaling a speedometer magnet shaft. The Teflon is impregnated by inserting the bearing in a vat containing an aqueous suspension of Teflon particles smaller than the surface pores of the bearing and exhausting the vat to create voids in the surface pores, which are filled by the Teflon. The impregnated bearing is then dried to assume its finished form.

---

This application is a continuation of application Ser. No. 570,960, filed Aug. 8, 1966, now abandoned for an improved bushing and method for making the same, and more particularly to an improvement in bushings of the type used in instruments such as speedometers or the like and a method for making said improvement.

Bushings for use in instruments such as speedometers are usually comprised of a sintered pressed bronze impregnated with oil and commonly called an oil lite bearing. This type of bushing or bearing apparently operates satisfactorily until the temperature drops to about or below −10° F., at which point the instrument may begin to chatter.

To avoid this problem the present invention proposes to substitute a Teflon impregnation for the oil impregnation normally used in sintered bronze instrument bearings. While the applicant is not aware of a specific reason for the improved results secured thereby, it has been found that the Teflon impregnated bronze bushings are not subject to the aforementioned chatter at or below the described temperature.

One object of the present invention, therefore, is to provide a Teflon impregnated bushing.

Other objects of the invention will become apparent on examination of the following specification, claim and drawings wherein:

Figure 1:
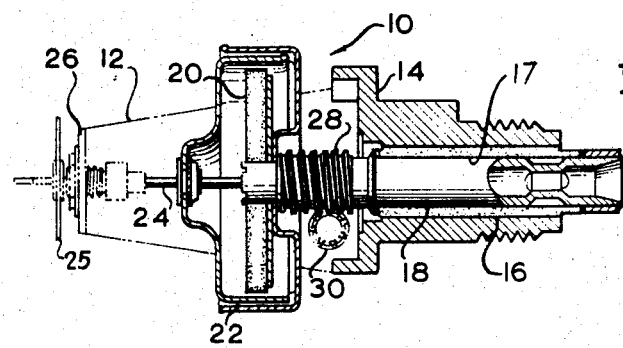
FIG. 1 is a sectional view of a typical speedometer employing the improved bushing with portions of the speedometer apparatus shown in broken lines.
Figure 2:
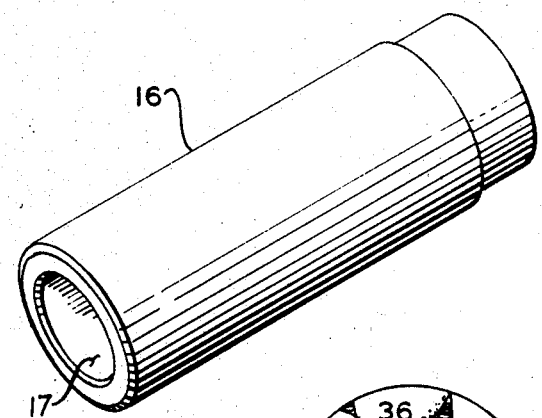
FIG. 2 is a perspective view of the bushing.

In FIG. 1 a typical speedometer is indicated at 10. The speedometer comprises a frame 12 having a hollow boss 14 to which the casing of a flexible shaft is attached.

A bearing 16 is carried in the boss and it has a Teflon impregnated inner surface 17 for journaling a shaft 18. The shaft 18 has a recess at one end for receiving the tip or connecting portions of a flexible shaft which drives the shaft 18. The other end of the shaft 18 carries a permanent magnet 20 and spaced field pole for driving a speed cup 22.

The speed cup 22 is fixedly carried on a separate shaft 24 having one end journaled at the end of shaft 18 and a pointer (not shown) at its opposite end for indicating speed. A hairspring 25 maintains the shaft 24 and pointer in their home position until rotated by magnet 20. The shaft 24 is also journaled intermediate its ends in a bearing mounted in bracket 26 carried on the ends of the frame 12. A gear 28 intermediate the ends of shaft 18 is commonly used to drive an odometer (not shown) through a gear train indicated in part by gear 30.

The bushing or bearing 16 comprises a sintered bronze impregnated with polytetrafluoroethylene commonly known as Teflon. The Teflon is purchased in the form of an aqueous suspension known as 30 TFE-Fluorocarbon Resin from the Du Pont Chemical Company. This suspension constitutes about 60% solids by weight with Teflon particle sizes small enough to enter the bushing pores. Typically the particle sizes will range from .05 to .5 micron.

Figure 3:
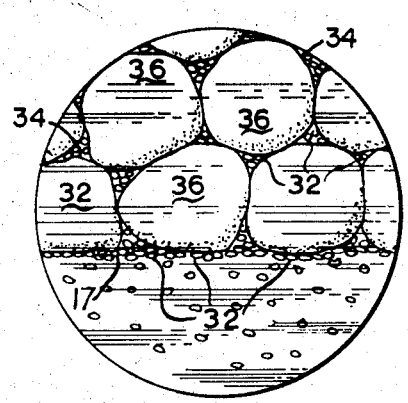
FIG. 3 is an enlarged fragmentary view of a portion of the bearing surface impregnated with Teflon prior to drying.

The aqueous suspension of Teflon, together with a number of bearings 16 which have been completely pressed to size and have a sized bore, are deposited in a vat with the vat being as full as possible. A vacuum is then drawn in the vat to cause air trapped in the pores of the sintered bronze bearing to be evacuated. The result is that the Teflon particles, indicated at 32 in FIG. 3, coagulate in the pores 34 of the sintered bronze bearing, to replace the air withdrawn as a result of the vacuum created in the vat. The grains of sintered bronze are indicated at 36.

Figure 4:
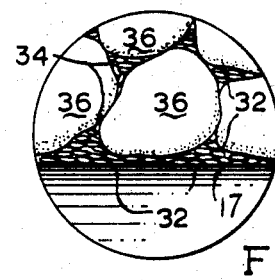
FIG. 4 is an enlarged fragmentary view of a portion of the bearing surface after drying.

Thereafter, the bearings and wet Teflon are placed in a container and the entire group of bearings heated to a temperature of about 400° F. This drives off the residual moisture leaving the pores 34 between the grains 36 impregnated with Teflon 32 as shown by the enlarged fragmentary view in FIG. 4.

The bearing 16 can then be mounted in a speedometer, for example, or in such instruments as tachometers and hour meters, and the shaft 18 driven at any one of a plurality of speeds at temperatures down to −50° F. without chatter. It will be appreciated that it may be possible to use plastic materials other than Teflon as long as such materials have a low coefficient of friction commonly called self lubricating.

The foregoing constitutes a description of an improved bearing together with a method of making the same with the inventive concepts incorporated in said description believed set forth in the accompanying claim.

What is claimed is:

1. A speedometer of the type including a magnet shaft of metal having a magnet at one end and rotatably driven by a flexible shaft with an indicator shaft having one end journaled at one end of the magnet shaft and carrying a speed cup rotated to a position corresponding to the speed of rotation of said magnet in response to the rotation of said magnet, the improvement comprising a sintered bronze bushing having an opening therethrough for receiving and rotatably supporting said magnet shaft with the surface of said opening having surface pores between the grains of pressed sintered bronze, and particles of polytetrafluoroethylene between .05 micron and .5 micron and smaller than the dimensions of said pores impregnated in said surface pores only for providing a surface having both sintered bronze and polytetrafluoroethylene particles to rotatably support said magnet shaft and avoid chatter in response to the rotation of said magnet shaft in an environment having an ambient temperature lower than 0° Fahrenheit.

References Cited

UNITED STATES PATENTS

| 2,838,829 | 6/1958 | Goss et al. | |
| 3,111,037 | 11/1963 | Wallis. | |
| 3,196,692 | 7/1965 | Jensen | 73—496 |

FOREIGN PATENTS

| 707,065 | 4/1954 | Great Britain. |
| 711,620 | 7/1954 | Great Britain. |

CARROLL B. DORITY, JR., Primary Examiner

U.S. Cl. X.R.

73—496; 308—237, 238